United States Patent
Downing

(10) Patent No.: US 8,157,394 B1
(45) Date of Patent: Apr. 17, 2012

(54) ATTACHABLE ADJUSTABLE MIRROR

(76) Inventor: William Downing, Coushatta, LA (US)

( * ) Notice: Subject to any disclaimer, the term of this patent is extended or adjusted under 35 U.S.C. 154(b) by 0 days.

(21) Appl. No.: 12/900,033

(22) Filed: Oct. 7, 2010

Related U.S. Application Data

(60) Provisional application No. 61/249,322, filed on Oct. 7, 2009.

(51) Int. Cl.
*G02B 5/10* (2006.01)
*G02B 7/182* (2006.01)
(52) U.S. Cl. ......... 359/868; 359/872; 359/881; 248/476
(58) Field of Classification Search .................. 359/868, 359/872, 881; 248/476, 479, 480
See application file for complete search history.

(56) References Cited

U.S. PATENT DOCUMENTS

| | | | | |
|---|---|---|---|---|
| 1,849,001 A * | 3/1932 | Fisher | ............................ | 359/855 |
| 1,918,802 A * | 7/1933 | Fleischer | ...................... | 359/863 |
| 2,013,882 A * | 9/1935 | Francis | ...................... | 248/277.1 |
| D160,995 S | 11/1950 | Busa | | |
| 3,118,965 A * | 1/1964 | Jones | ............................ | 248/477 |
| 4,349,246 A * | 9/1982 | Binner | ........................... | 359/880 |
| 4,750,811 A * | 6/1988 | Beyer | ............................ | 359/602 |
| 4,909,619 A * | 3/1990 | Eifert | ............................ | 359/876 |
| 5,106,177 A | 4/1992 | Dolasia | | |
| 5,383,061 A | 1/1995 | Lanier | | |
| 5,400,183 A * | 3/1995 | Rosser | ........................... | 359/872 |
| 5,604,633 A | 2/1997 | Christianson | | |
| D406,312 S | 3/1999 | Fusca | | |
| 5,943,175 A | 8/1999 | LaViola | | |
| 6,039,455 A | 3/2000 | Sorenson | | |
| 6,220,717 B1 | 4/2001 | Pastore | | |
| 7,300,170 B2 | 11/2007 | Jasmin et al. | | |
| 2004/0125477 A1* | 7/2004 | Carter et al. | ................... | 359/881 |
| 2006/0086571 A1* | 4/2006 | Hubble et al. | ................. | 182/187 |
| 2011/0216427 A1* | 9/2011 | McCarty, Jr. | .................. | 359/855 |

* cited by examiner

*Primary Examiner* — Ricky D Shafer
(74) *Attorney, Agent, or Firm* — Montgomery Patent & Design, LLC; Robert C. Montgomery; Joseph T. Yaksich

(57) ABSTRACT

A mirror assembly having a versatile clamping assembly for use during hunting or other outdoor sporting activities comprises an adjustable mirror which provides a user with a wide viewing angle to the rear and periphery of a current location. The mirror assembly is attached to an upper end of a flexible arm element that provides multiple degrees of articulation as desired by the user. A bottom end of the arm element is affixed to a clamping mechanism which enables the assembly to attach to various sized branches, railings, platforms, or other structures. The clamping mechanism further provides a pair of thumb-screw fasteners on the handle which enable the clamp to be secured to inserted branches or similar objects.

12 Claims, 4 Drawing Sheets

ATTACHABLE ADJUSTABLE MIRROR

RELATED APPLICATIONS

The present invention was first described in and claims the benefit of U.S. Provisional Application No. 61/249,322 filed Oct. 7, 2009, the entire disclosures of which are incorporated herein by reference.

FIELD OF THE INVENTION

The present invention relates generally to mirrors, and in particular, to an adjustable mirror particularly adapted for use while hunting from an elevated, stationary position.

BACKGROUND OF THE INVENTION

The use of a tree stand is common for hunting in wood areas. Tree stands allow a single user to easily scale to the upper reaches of a tree and securely perch in the elevated position in order to more readily spot, target, and drop prey without risk of discovery.

Due to the fact that the efficacy of such tree stands relies largely upon the stealth provided to the hunter, it is generally advantageous for a hunter to move about as little as possible so as not to alert nearby animals to their presence. However, this stationary positioning strategy combined with the confined nature of the tree stands and vision blockage due to the tree itself can lead to situations where a hunter misses a prime opportunity to locate nearby animals which are not within their field of vision.

Various attempts have been made to provide sighting apparatuses for use while hunting. Examples of these attempts can be seen by reference to several U.S. patents. U.S. Pat. No. 5,383,061, issued in the name of Lanier, describes a rearview minor apparatus for hunters which attaches to a tree trunk via a penetrating spike.

U.S. Pat. No. 6,220,717, issued in the name of Pastore, describes an elevated hunter stand mirror with a clamping attachment means.

Additionally, ornamental designs for a hunting minor exist, particularly U.S. Pat. No. D 406,312. However, none of these designs are similar to the present invention.

While these apparatuses fulfill their respective, particular objectives, each of these references suffer from one (1) or more of the aforementioned disadvantages. Many such apparatuses do not provide attachment to a wide range of structures. Also, many such apparatuses are not fully adjustable, particularly with regards to angling, rotation, and horizontal distance of the mirror. Furthermore, many such apparatuses are not adjustable in a manner which is quick and quiet in accordance with desirable hunting practices. Accordingly, there exists a need for a hunting stand minor without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for an apparatus which provides a wide viewing range to a hunter in a tree stand in a manner which is discretely adjustable and attachable to a wide variety of surfaces and objects. Thus, the object of the present invention is to solve the aforementioned disadvantages and provide for this need.

To achieve the above objectives, it is an object of the present invention to provide a mountable visual reflecting means enabling rear and peripheral views during hunting or similar activities. The apparatus comprises a mirror assembly, a flexible arm assembly, and a clamping assembly.

Another object of the present invention is to enable securement of the apparatus to variously shaped appendages found in outdoors settings such as tree trunks, tree branches, and hunting tree stands. The apparatus is secured with the clamping assembly which comprises a hand-operated spring-loaded pinching mechanism which pivotingly connects a first handle and a second handle.

Yet still another object of the present invention is to provide a wide viewing angle of rear and peripheral directions from a stationary position by adjusting the minor assembly.

Yet still another object of the present invention is to enable adjusting of the position of the minor assembly via adjustment of the flexible arm assembly. The arm assembly comprises flexible member which connects the minor assembly to the clamping assembly. The arm assembly is capable of repeated motioning without experiencing fatigue or breaking.

Yet still another object of the present invention is to allow a user to position the mirror at any point along the arm assembly. A rear portion of the mirror assembly comprises a clamp and a wing nut which allow a user to selectively tighten or loosen the mirror to the arm assembly.

Yet still another object of the present invention is to provide various degrees of convex curvature to the minor to produce a wide-angle reflected image.

Yet still another object of the present invention is to enable the assembly to clamp securely onto variously shaped large objects when positioned between the handles of the clamping assembly via a pair of thumb-screw fasteners integral to the second handle.

Yet still another object of the present invention is to provide a method of utilizing the device that provides a unique means of obtaining an instance of the apparatus, selecting a location for installing the apparatus such as to provide advantageous viewing angles during hunting or a similar activity, opening the handles of the clamping assembly and releasing them over the desired attachment point in order to provide a clamping securement of the apparatus, utilizing the thumb-screws for additional securement as desired, securing the minor assembly in a desired position along the arm assembly with the clamp and wingnut, motioning the arm assembly to position the mirror at a desired location and angle in order to provide a desired view, and adjusting the mirror assembly and arm assembly as desired during use.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
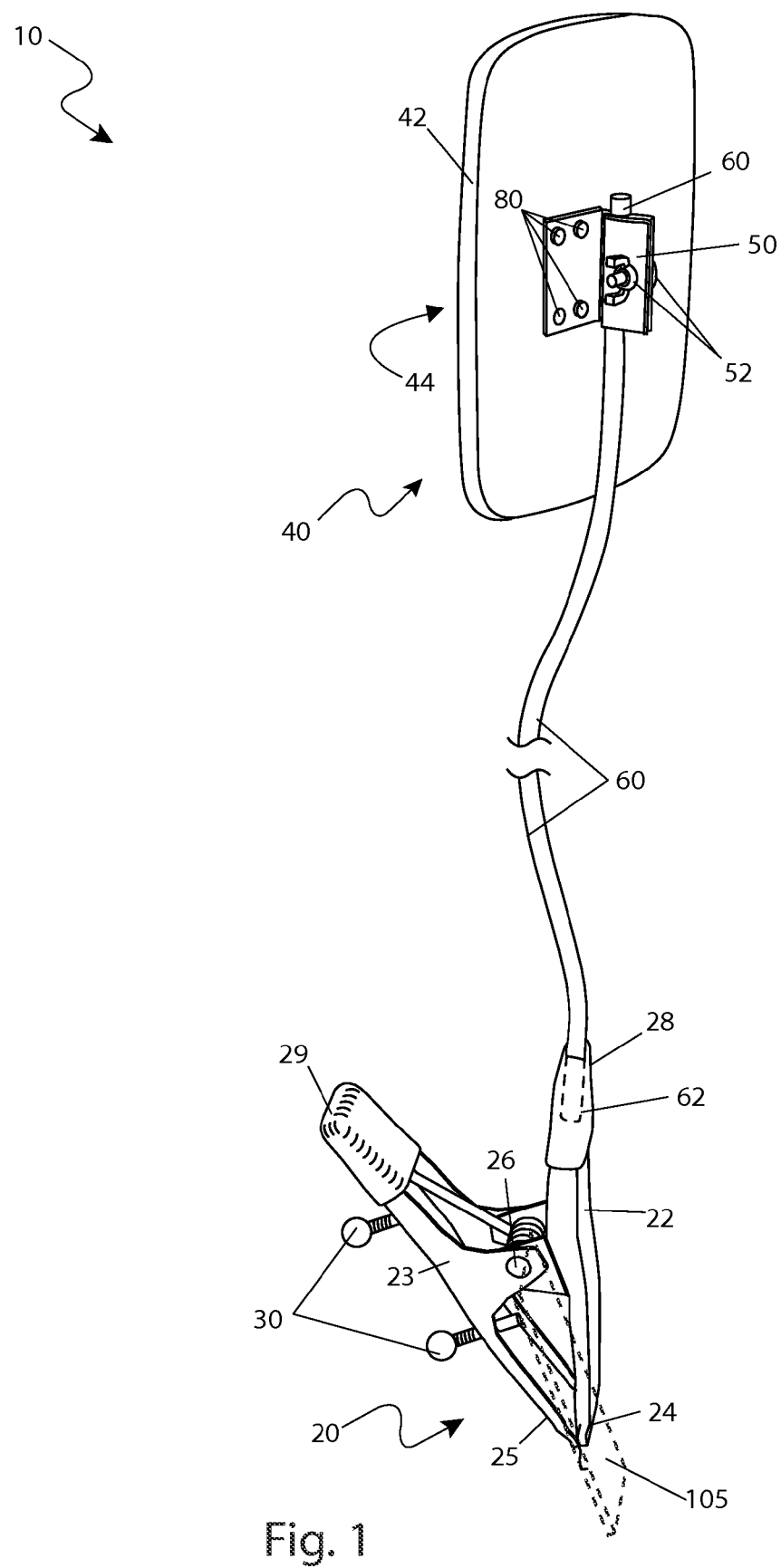
FIG. 1 is a perspective view of an attachable adjustable minor 10, according to a preferred embodiment of the present invention.

DESCRIPTIVE KEY 10 attachable adjustable mirror
20 clamp assembly
22 first handle
23 second handle
24 first jaw
25 second jaw
26 pivot pin
27 torsion spring
28 first end cap
29 second end cap
30 thumb-screw
40 mirror assembly
42 housing
44 mirror
46 bracket
50 clamp
52 wingnut/bolt
60 arm
61 core
62 connection
80 fastener
100 structure
105 appendage
110 user
120 tree
125 branch

DETAILED DESCRIPTION OF THE PREFERRED EMBODIMENT

The best mode for carrying out the invention is presented in terms of its preferred embodiment, herein depicted within FIGS. 1 through 3b. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an attachable adjustable mirror (herein described as the "assembly") 10, which provides a mountable visual reflecting means enabling a rear or peripheral view during hunting or other outdoor sporting activities. The assembly 10 comprises a reflective mirror assembly 40 being attached to a flexible arm 60 which in turn is attached to a versatile clamping assembly 20. The clamping assembly 20 enables the assembly 10 to be secured to various shaped appendages associated with an outdoor setting such as tree branches 125, deer hunting stand features, platform features, and the like. The assembly 10 provides a user 110 with a wide viewing angle of rear and peripheral directions from a current position. The mirror assembly 40 is attached to an upper end portion of the flexible arm 60 which provides versatile positioning of said minor assembly 40 by the user 110.

Referring now to FIG. 1, a perspective view of the assembly 10, according to the preferred embodiment of the present invention, is disclosed. The assembly 10 comprises a clamping assembly 20, a minor assembly 40, and a flexible arm 60. The clamp assembly 20 comprises a hand operated spring-loaded pinching mechanism comprising a first handle 22 and a second handle 23 being pivotingly connected together at respective intermediate locations (see FIG. 3).

The first handle portion 22 of the clamp assembly 20 provides a rigid attachment means to a proximal end of the flexible arm 60, thereby providing ample positional manipulation of the mirror assembly 40 with respect to the clamp assembly 20. The arm 60 comprises a flexible member approximately one-half (½) inch in diameter and eighteen (18) inches in length being capable of positioning the minor assembly 40 as well as wrapping around various cylindrical or randomly-shaped objects such as, but not limited to: tree branches 125, tree trunks 120, structures, railings, and the like. The flexible arm 60 is preferably made of ductile heavy-gauge insulated electrical cable or equivalent flexible materials such as, but not limited to: interconnected articulating sectionalized elements, filled or hollow metal tubing, or the like. The arm 60 is to be capable of repeated motioning without experiencing metallurgical fatigue or breaking.

The distal end of the arm 60 provides an attachment means to the minor assembly 40 being rotatingly and linearly adjustable via an integral connecting bracket portion 46 of the mirror assembly 40. Said mirror assembly 40 comprises a panel of reflective glass 44 along one (1) surface, being securely framed by a plastic or metal housing 42 which extends along edge and rear surfaces of the mirror assembly 40. Although illustrated here comprising a rectangular shape with rounded corners, the minor assembly 40 is further envisioned being introduced having various perimeter shapes such as, but not limited to: round, oval, or other shapes based upon a user's 110 preference. However, said mirror assembly 40 is to provide sufficient height and width dimensions so as to enable a wide field of view to the user 110 during various sporting activities such as hunting. It is also understood that the mirror 44 may be provided having various degrees of convex curvature to produce a wide-angle reflected image, thereby further enhancing the user's 110 field of view. The housing portion 42 of the minor assembly 40 provides an attachment means to the bracket 46 being affixed to a rear surface using a plurality of common fasteners 80 such as rivets, screws, adhesives, or the like. The bracket 46 comprises a vertical open-ended cylindrical clamping portion 50 being internally sized so as to slidingly receive the flexible arm 60 within. The clamp 50 further provides a tightening means comprising a wingnut/bolt 52 to tighten the clamp 50 around the arm 60, thereby securing said arm 60 to the minor assembly 40. The clamp 50 enables the minor assembly 40 to be slidingly positioned at any position along the arm 60; rotated to a desired direction; and, to be secured in position using the wingnut/bolt 52.

It is envisioned that the assembly 10 may be introduced in a variety of external colors and patterns such as various camouflage patterns, being suitable to particular sporting activities and surroundings.

Figure 2:
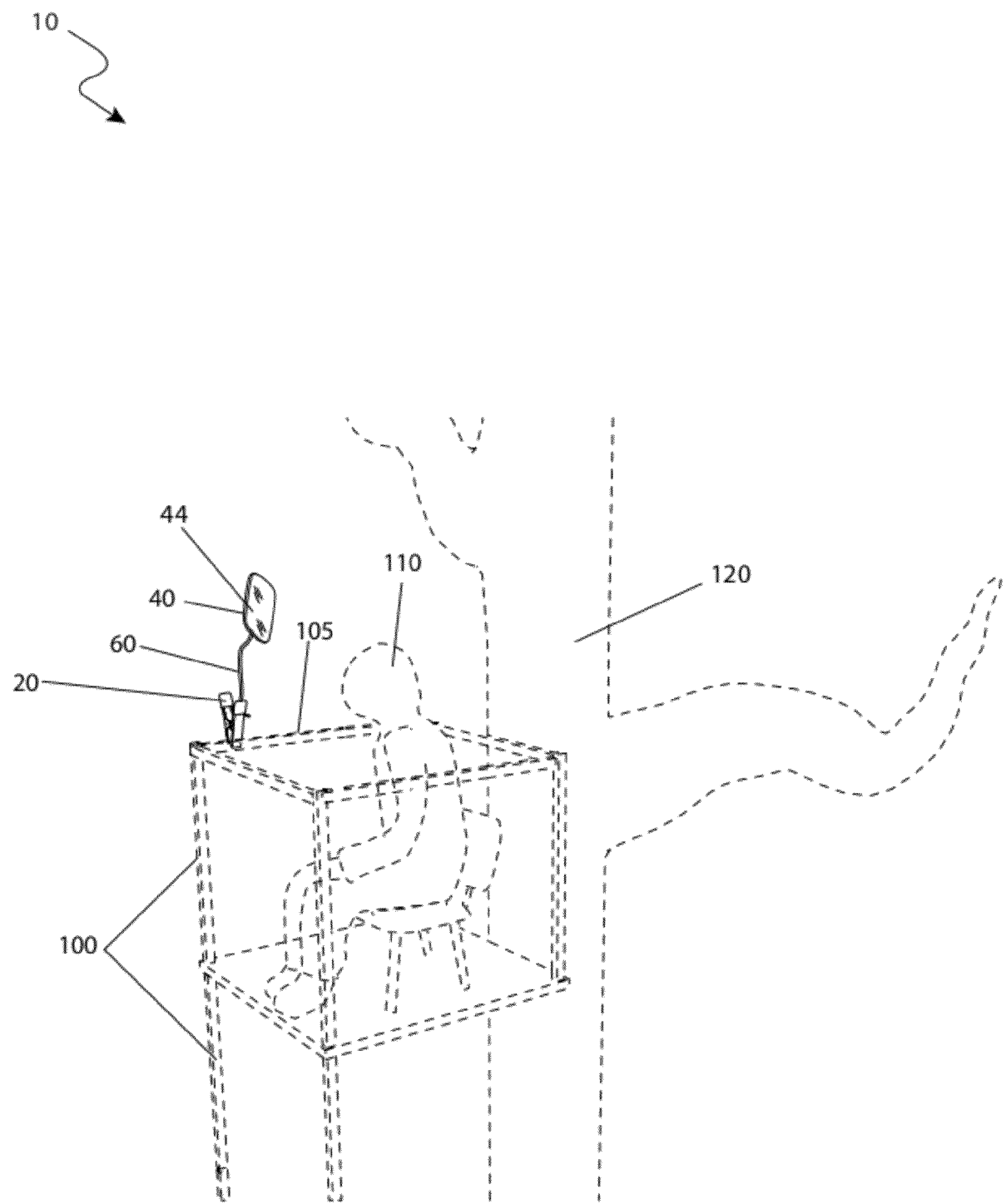
FIG. 2 is an environmental view of attachable adjustable mirror 10, according to a preferred embodiment of the present invention.

Referring now to FIG. 2, an environmental view of the assembly 10, according to the preferred embodiment of the present invention, is disclosed. The assembly 10 is illustrated here being utilized to enhance a field of view behind or below a user 110 occupying a stationary tree stand structure 100 being affixed to a tree 120 while participating in a hunting activity. It is understood that the clamping assembly 20 allows the assembly 10 to be attached to a variety of appendages 105 such as but not limited to: tree branches 125, tree trunks 120, hunting blind frames, porch railings, platforms, various structures, and the like.

Figure 3A:
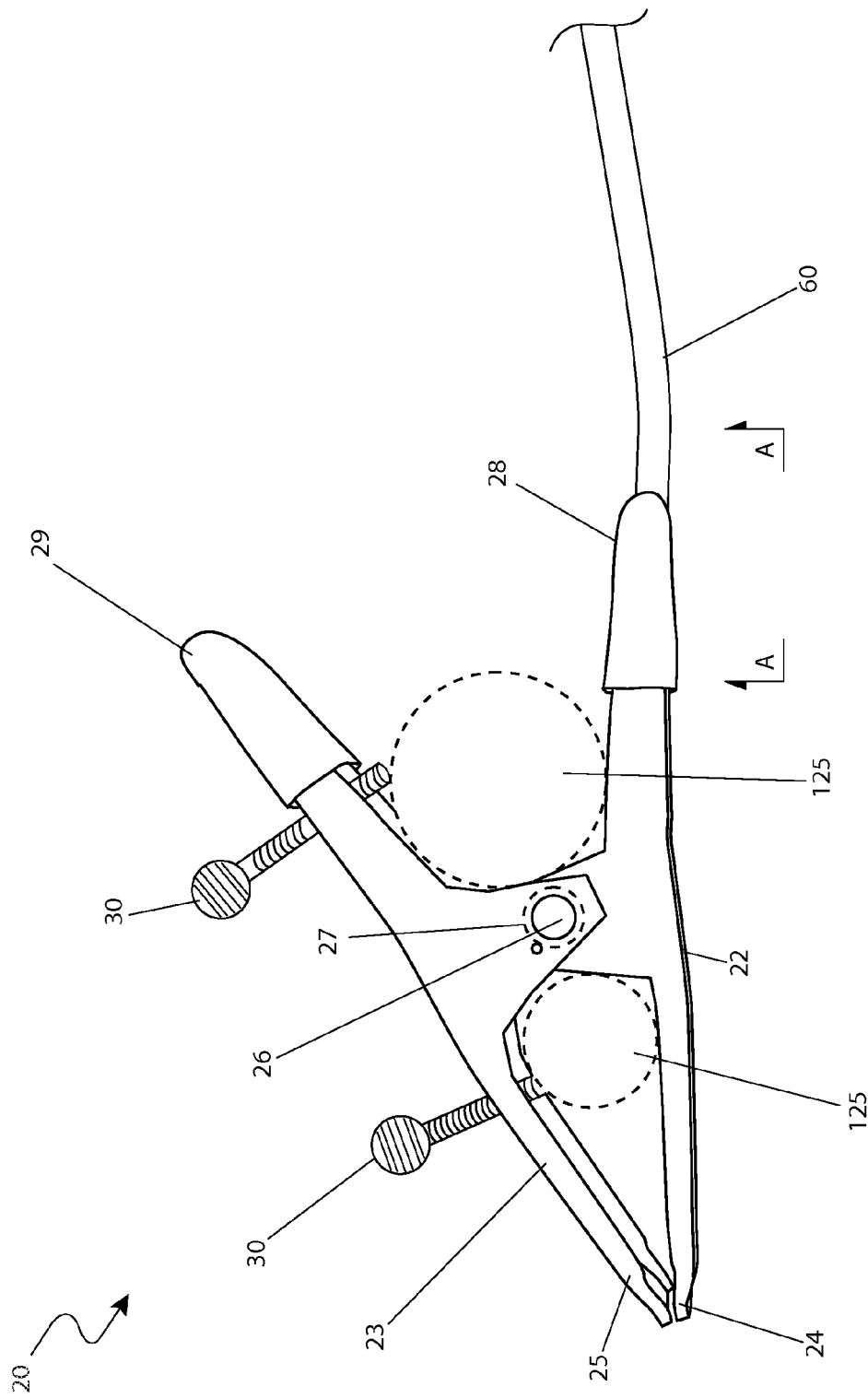
FIG. 3a is a close-up view of a clamp assembly portion 20 of the attachable adjustable mirror 10, according to a preferred embodiment of the present invention; and, FIG. 3b is a section view of a connection portion 60 of a first handle 23 taken along section line A-A (see FIG. 3a), according to a preferred embodiment of the present invention.
Figure 3B:
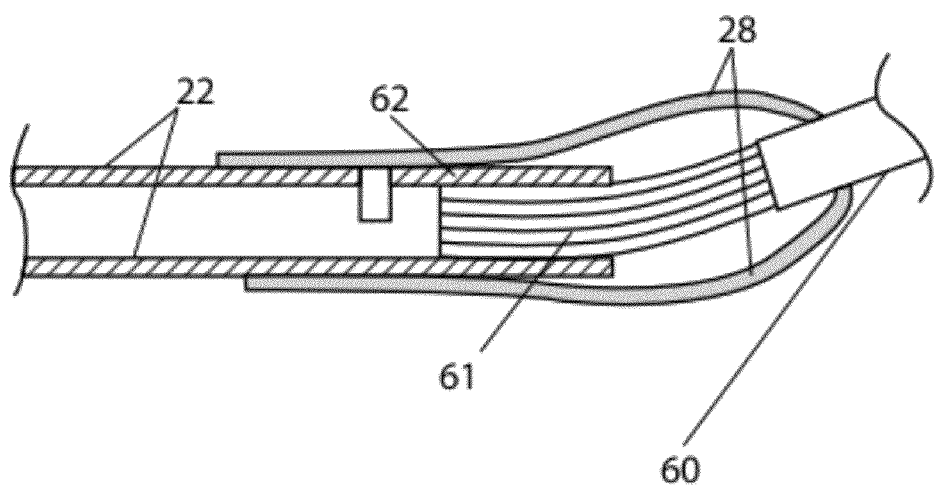

Referring now to FIGS. 3a and 3b, close-up and section views of the clamp assembly portion 20 of the assembly 10, according to a preferred embodiment of the present invention, are disclosed. The clamp assembly 20 comprises a common hand-held scissors-type mechanism being similar to an automotive jumper cable clamp. The clamp assembly 20 comprises first 22 and second 23 handle portions being connected at an intermediate location using a pivot pin 26 which is encompassed around by a torsion spring 27 in a conventional manner to force said clamp assembly 20 closed when released. The first handle portion 22 further comprises a respective pinching first jaw portion 24 at a distal end and an aesthetic plastic or rubber first end cap 28 at a proximal end. The second handle 23 further comprises a second pinching jaw 25 at a distal end and a second end cap 29 affixed to a proximal end which further comprises an aperture portion to receive the arm 60 therethrough. The jaws 24 comprise rectangular parallel clamping surfaces which allow the assembly 10 to pinch and be secured to various appendages 105 such as branches 125, railings, structural members, and the like.

The assembly 10 further provides a pair of thumb-screw fasteners 30 positioned along and threadingly protruding through the second handle portion 23, thereby enabling the assembly 10 to clamp onto objects such as larger branches 125 or similar objects which are positioned between said handles 22, 23 as seen here.

A proximal end of the first end cap 28 portion of the first handle 22 provides a strong linear attachment to the flexible arm 60 preferably using a conventional mechanically-crimped connection 62. The crimped connection 62 is fastened to the core portion 61 of the arm 60.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the assembly 10, it would be installed and utilized as indicated in FIGS. 2 and 3a.

The method of utilizing the assembly 10 may be achieved by performing the following steps: procuring the assembly 10 having a desired external color and/or pattern; selecting a location in which to install the assembly 10 so as to increase a user's 110 field of view while performing a hunting activity or other similar sporting event; strategically positioning the assembly 10 in a forward or slightly side-of-forward location, thereby allowing sideways or rearward observation while minimizing a user's 110 physical movement; clamping the first 24 and second 25 jaw portions of said assembly 10 to a structure 100 or an appendage 105 such as a tree-stand railing, a window frame, or the like, by squeezing, clamping, and releasing the first 22 and second 23 handle portions of said assembly 10; adjusting a position of the mirror assembly 40 by manually flexing the arm portion 60 and also configuring the bracket 46 in vertical and radial axis' to achieve a desired view of an area as reflected in the mirror 44; securing said assembly 10 in the desired position by tightening said bracket 46 using the wingnut/bolt portion 52 to tighten the clamp 50; and, benefiting from an enhanced field of view with minimal bodily movement while performing hunting or other similar activities using said present assembly 10.

The assembly 10 may also be affixed to a small tree branch 125 or similar cylindrical appendage 105 by inserting said branch 125 between said first 22 and second 23 handle portions; and, rotating at least one (1) thumb-screw 30 to clamp said branch 125.

Furthermore the assembly 10 may be secured to a small tree trunk 120 or similar object, by radially wrapping the flexible arm portion 60 around and thereby encompassing said object 120 to stabilize the assembly 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An attachable and adjustable minor assembly, comprising:
    a clamping assembly comprising a hand-operated spring-loaded clamp mechanism further comprising:
        a first handle, comprising a first jaw portion at a proximal end and a first end cap at a distal end;
        a second handle pivotally connected to said first handle at an intermediate location of both said first handle and said second handle with a pivot pin, further comprising a second jaw portion at a proximal end and a second end cap at a distal end; and,
        a torsion spring encompassing said pivot pin;
    an elongated flexible adjustment arm, comprising a lower end attached to and outwardly extending from said first end cap of said clamping assembly; and,
    a mirror member adjustably attached to an upper end of said flexible adjustment arm;
    wherein said first jaw portion and said second jaw portion of said clamping assembly removably attaches said minor assembly to a support structure;
    wherein said torsion spring provides a force to clamp said first jaw portion and said second jaw portion together, thereby entrapping said support structure between;
    wherein said clamping assembly comprises a means to securely clamp said minor assembly to said support structure comprising varied geometries;
    wherein said clamping assembly further comprises a pair of thumb-screw fasteners positioned along and threadingly protruding through said second handle portion for providing an auxiliary securing means for said clamping assembly to another support structure; and,
    wherein said flexible adjustment arm adjusts a relative position of said mirror member to a desired position.

2. The mirror assembly of claim 1, wherein at least one of said pair of fasteners is located between said second end cap and said pivot pin.

3. The minor assembly of claim 1, wherein said clamping assembly comprises a jumper cable clamp.

4. The minor assembly of claim 1, wherein said flexible adjustment arm is crimped within said distal end of said first handle, said flexible adjustment arm routed through an aperture of said first end cap.

5. The mirror assembly of claim 4, wherein said flexible adjustment arm further comprises a ductile heavy-gauge insulated electrical cable.

6. The mirror assembly of claim 4, wherein said minor member further comprises:
- a mirror comprising a reflective surface;
- a housing surrounding and supporting said mirror on five sides; and,
- a connecting bracket affixed to a rear surface of said housing, further comprising a vertical open-ended cylindrical clamp;
- wherein said flexible adjustment arm is removably connected to said cylindrical clamp via a clamp fastener; and,
- wherein said clamp fastener provides a rotatable and linear adjustment of said minor member relative to said flexible adjustment arm.

7. An attachable and adjustable minor assembly, comprising:
- a clamping assembly, comprising a hand-operated spring-loaded clamp mechanism further comprising:
  - a first handle, comprising a first jaw portion at a proximal end and a first end cap at a distal end;
  - a second handle pivotally connected to said first handle at an intermediate location of both said first handle and said second handle with a pivot pin, further comprising a second jaw portion at a proximal end and a second end cap at a distal end; and,
  - a torsion spring encompassing said pivot pin;
- an elongated flexible adjustment arm, comprising a lower end attached to and outwardly extending from said first end cap of said clamping assembly; and,
- a minor member adjustably attached to an upper end of said flexible adjustment arm, further comprising a wide-angled mirror;
- wherein said first jaw portion and said second jaw portion of said clamping assembly removably attaches said minor assembly to a support structure;
- wherein said torsion spring provides a force to clamp said first jaw portion and said second jaw portion together, thereby entrapping said support structure between;
- wherein said clamping assembly comprises a means to securely clamp said minor assembly to said support structure comprising varied geometries;
- wherein said clamping assembly further comprises a pair of thumb-screw fasteners positioned along and threadingly protruding through said second handle portion for providing an auxiliary securing means for said clamping assembly to another support structure; and,
- wherein said flexible adjustment arm adjusts a relative position of said mirror member to a desired position.

8. The minor assembly of claim 7, wherein at least one of said pair of fasteners is located between said second end cap and said pivot pin.

9. The minor assembly of claim 7, wherein said clamping assembly comprises a jumper cable clamp.

10. The minor assembly of claim 7, wherein said flexible adjustment arm is crimped within said distal end of said first handle, said flexible adjustment arm routed through an aperture of said first end cap.

11. The minor assembly of claim 10, wherein said flexible adjustment arm further comprises a ductile heavy-gauge insulated electrical cable.

12. The minor assembly of claim 10, wherein said minor member further comprises:
- said wide-angled mirror, comprising a reflective surface;
- a housing surrounding and supporting said mirror on five sides; and,
- a connecting bracket affixed to a rear surface of said housing, further comprising a vertical open-ended cylindrical clamp;
- wherein said flexible adjustment arm is removably connected to said cylindrical clamp via a clamp fastener; and,
- wherein said clamp fastener provides a rotatable and linear adjustment of said minor member relative to said flexible adjustment arm.

* * * * *